H. S. HELE-SHAW.
VARIABLE STROKE MOTOR OR PUMP.
APPLICATION FILED MAY 19, 1909.

1,152,729.

Patented Sept. 7, 1915.
6 SHEETS—SHEET 1.

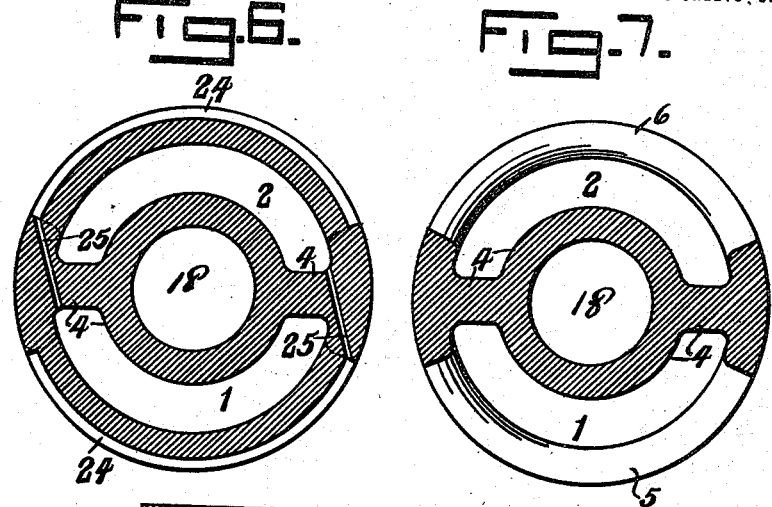
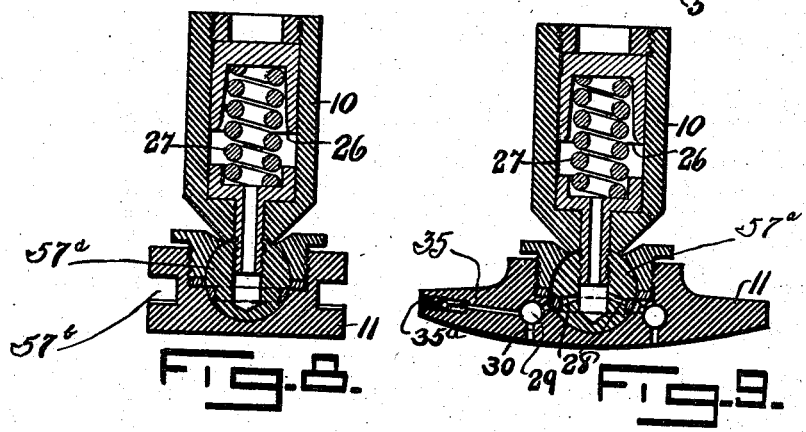
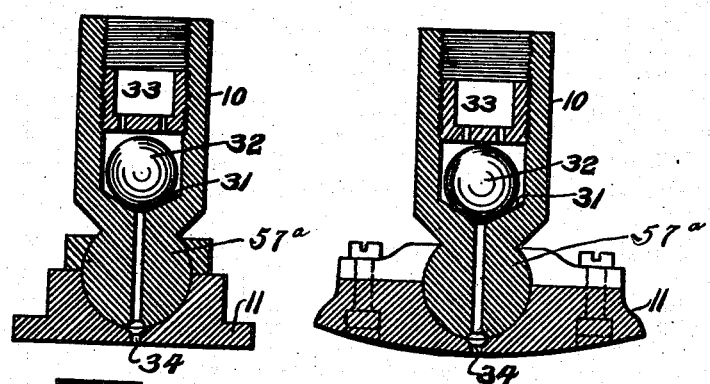

UNITED STATES PATENT OFFICE.

HENRY SELBY HELE-SHAW, OF LONDON, ENGLAND.

VARIABLE-STROKE MOTOR OR PUMP.

1,152,729.  Specification of Letters Patent.  Patented Sept. 7, 1915.

Application filed May 19, 1909. Serial No. 496,957.

*To all whom it may concern:*

Be it known that I, HENRY SELBY HELE-SHAW, a subject of the King of Great Britain, residing at London, in the county of London, England, have invented a new and useful Improvement in Variable-Stroke Motors or Pumps, of which the following is a specification.

This invention relates to improvements in and connected with hydraulic apparatus and has reference to a machine which can be used either as a pump or as a motor or where two similar machines are combined in a fluid circuit as a variable transmission gear.

The present invention has reference to machines of the type where radial cylinders rotate relatively to a stationary valve and consists of a particular construction of such apparatus involving certain essential and fundamental features.

The primary feature of the invention consists in the employment in combination with a central valve through which the liquid passes radially to and from the cylinders of a rotatable floating stroke controlling ring which rotates in company with the pistons although it is essentially characteristic of my invention that there is no definite connection of the piston heads with this ring. All the piston heads are free to move relatively to the ring and in fact when there is any eccentricity between the stroke controlling ring and the central valve, some slight relative movement must take place. By the combination of this floating ring with the radial valve all the forces exerted by the pistons upon the ring are transmitted in the plane of rotation, a point which I have proved by experiment to be of paramount importance in practical working. As a consequence of the detachment of the piston heads from the stroke controlling ring, it is necessary to provide some means for holding the piston heads up to the ring at all parts of the revolution and a further feature of my invention consists of a compensating ring engaging the piston heads and always maintain position concentric with the floating ring.

Other features of importance consist in the employment of slippers capable of angular movement carried by the piston heads and coöperating with a stroke controlling ring which is essentially rotatable or floating since the use of slippers with a non-rotatable ring has been found impracticable, unless special forced lubrication is provided.

Further features of my invention consist of several constructions of slippers provided with means for forcing a film of oil under the slipper and the special arrangement and combinations of parts set forth in the claims.

Figure 1:
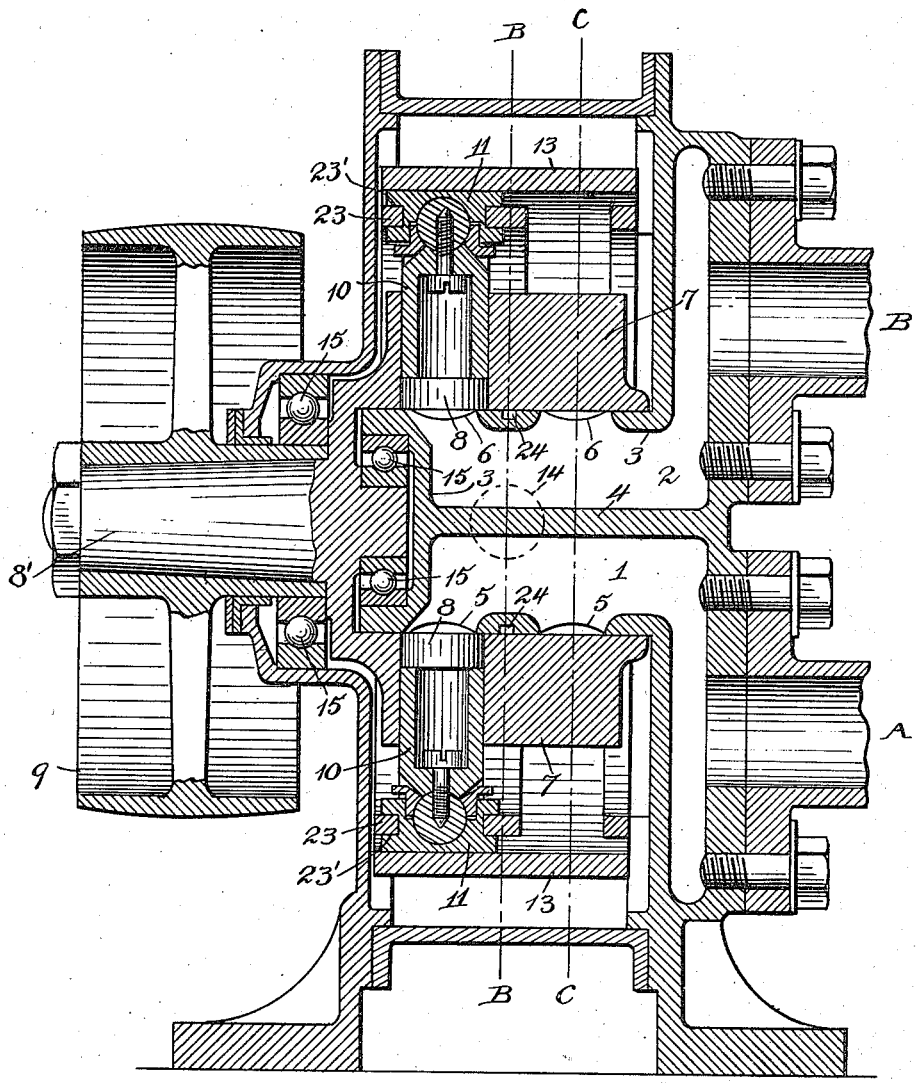
Figure 2:
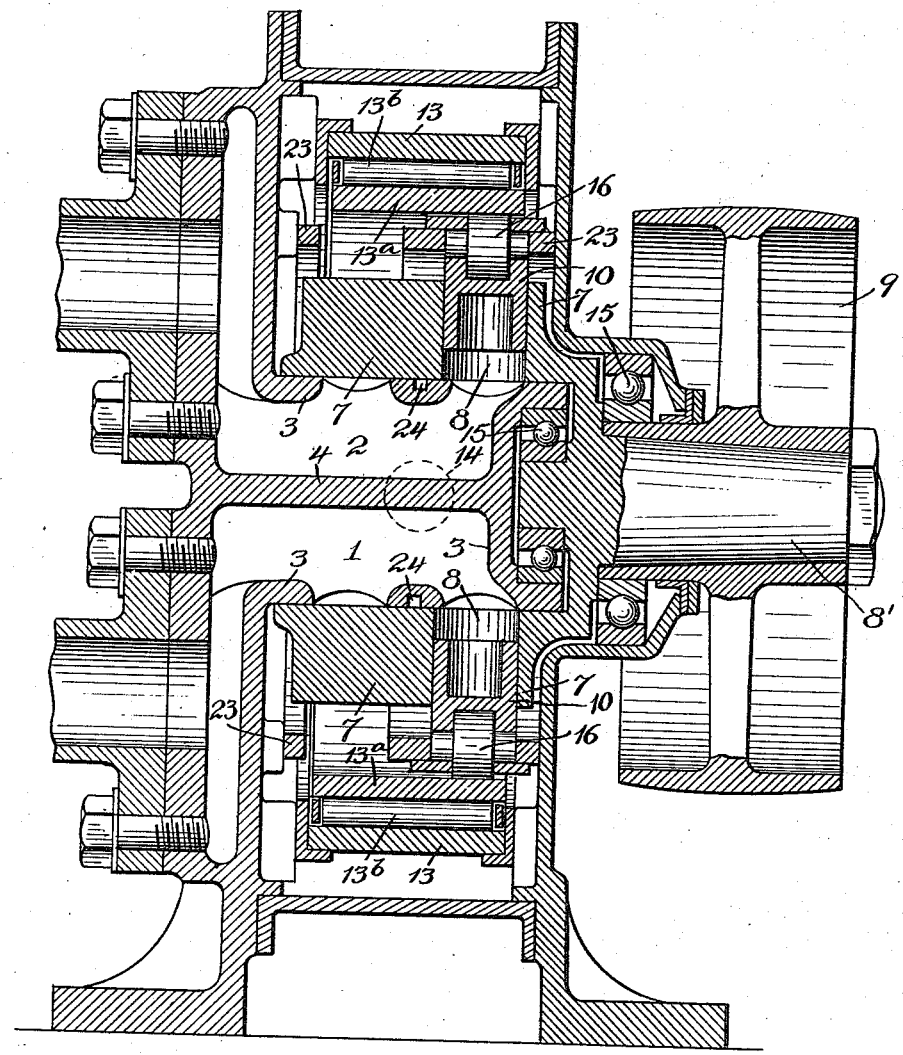
Figure 3:
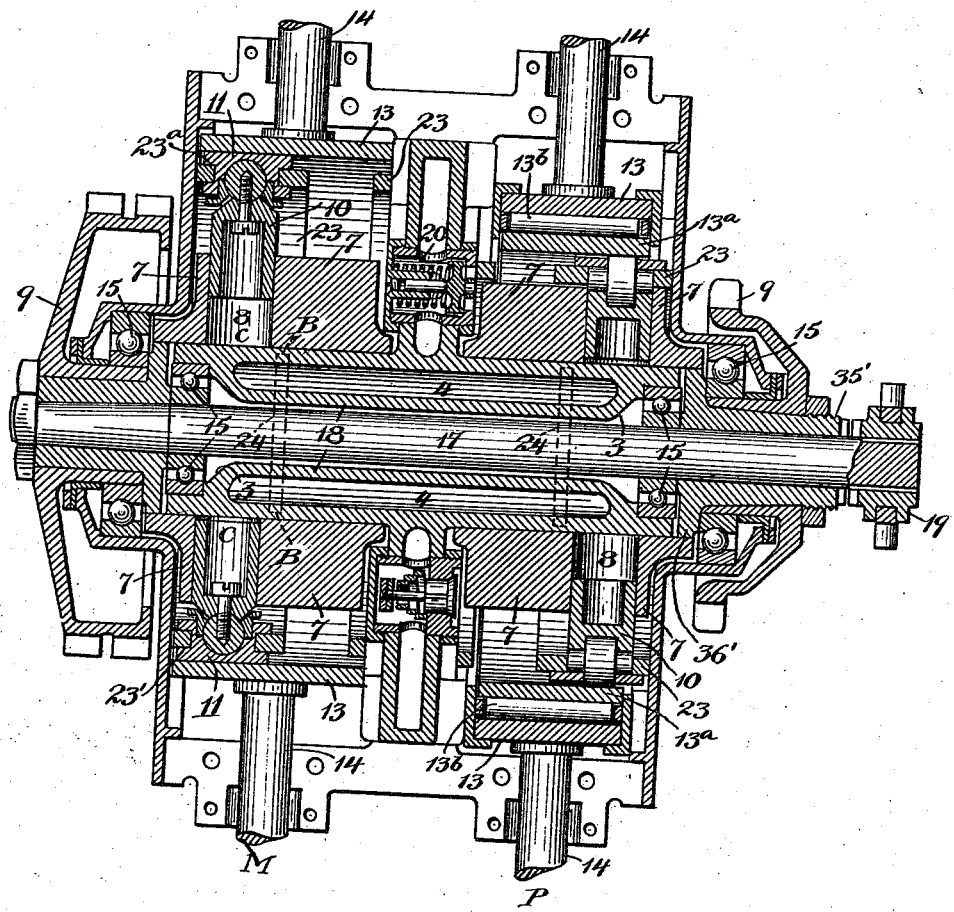
Figure 4:
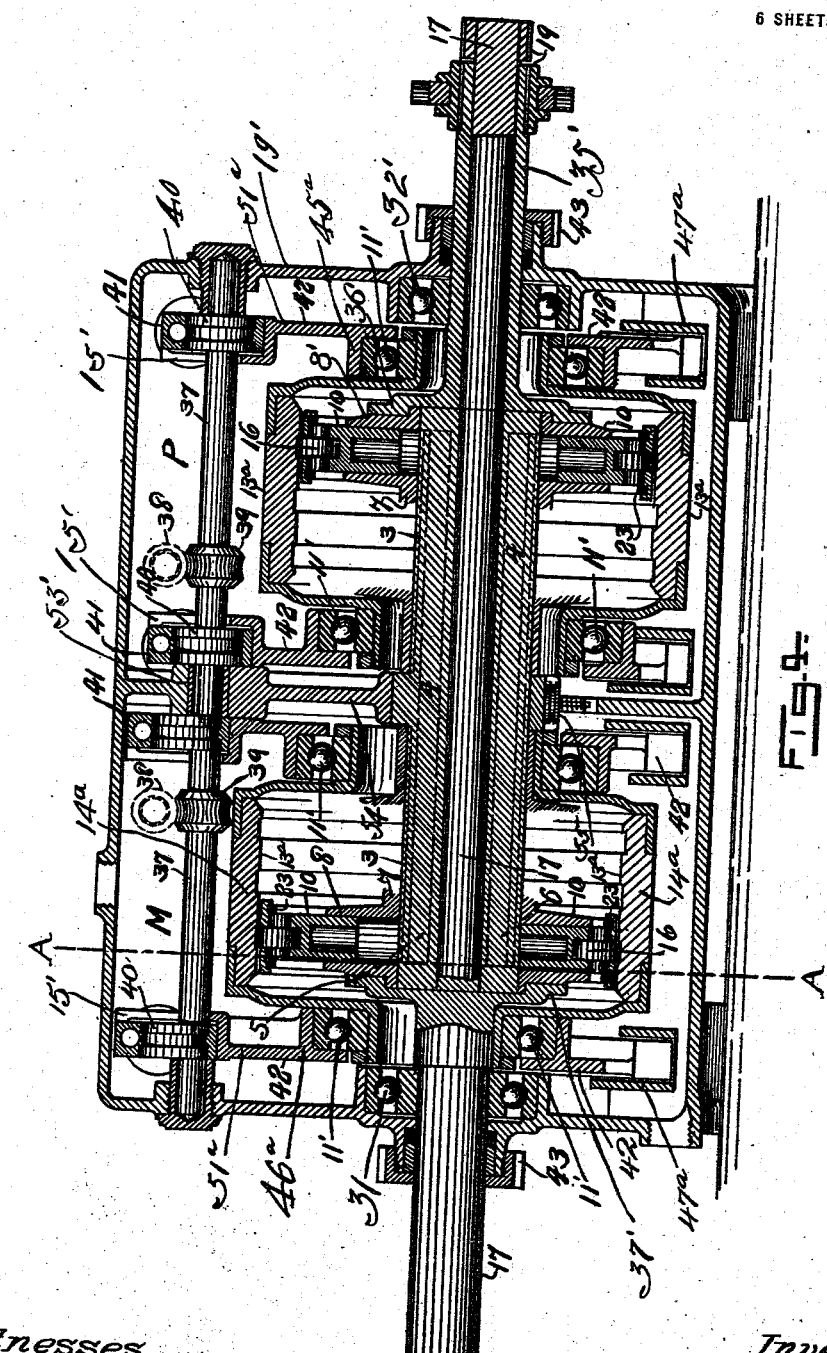
Figure 5:
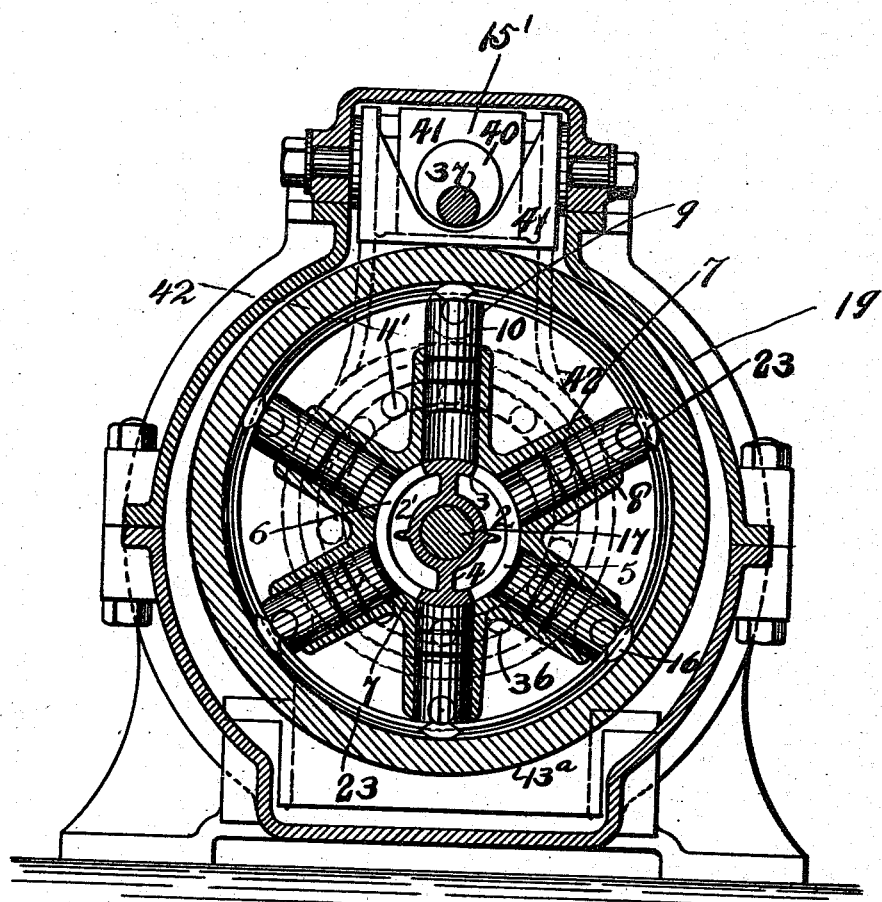

In the accompanying drawings Figure 1 is a sectional elevation of a form of my apparatus specially designed for use as a pump. Fig. 2 is a similar view of a modified form of the apparatus designed especially for use as a motor. Fig. 3 is a similar view illustrating the manner in which the devices shown in Figs. 1 and 2 can be combined in a machine to form a transmission gear. Fig. 4 is a longitudinal sectional view of a modified form of two of the devices shown in Fig. 1, and showing how they can be combined to form a variable speed transmission gear. Fig. 5 is an end sectional view on line A—A of Fig. 4. Figs. 6 and 7 are sectional views on line B—B and C—C respectively of Fig. 1 of the stationary valve. Figs. 8 and 9 are sectional views at right angles to each other of a modified form of slipper, and Figs. 10 and 11 are sectional views illustrating a slipper provided with a ball valve.

Referring to these drawings and particularly to Fig. 1, A designates the induction pipe and B the eduction pipe of a construction of my apparatus designed primarily for use as a pump. These pipes A and B are connected respectively to the low and high pressure sides 1 and 2 of the central cylindrical stationary valve 3, the high pressure side 2 of which is divided from the low pressure side 1 by means of a longitudinal diaphragm 4. This cylindrical valve 3 has inlet and outlet ports 5 and 6 respectively cut in it, and a cylinder body 7 is mounted to rotate upon this valve so that the open ends of the cylinders 8 coöperate with these ports as the cylinder body 7 rotates upon the stationary valve 3. The cylinders 8 are arranged in the cylinder body 7 preferably in more than one row and the cylinders of one row are staggered in position relative to the cylinders of the next row. The cylinder body 7 is connected up to a driving wheel or pulley 9 by means of which the cylinder body is, when the pump is in operation, continuously driven. Pistons 10 work in the cylinders 8 and these pistons carry out their outer ends slippers 11 which are capable of moving upon the ball heads 57ᵃ of the pistons. Surrounding these pistons and cylinders a ring or drum 13 is arranged and this ring or drum 13 is capable of having its axis moved by means of the rods 14 to various positions on either side of the main axis of the apparatus which is, of course, also the axis of the cylindrical valve 3. The axes of the cylindrical valve 3 and the drum 13 are always either coincident or parallel. In operation the cylinder body 7 is continuously rotated, ball bearings 15 preferably being provided to reduce friction. If the axes of the valve 3 and the drum 13 are coincident the slippers 11 merely rotate in contact with the inner periphery of the drum 13 and no flow of liquid takes place. If however, the axis of the drum 13 is moved so that the said drum 13 is situated eccentrically in relation to the valve 3 reciprocating movement will be imparted to the pistons 10, and this reciprocation will cause fluid to enter the valve and cylinders from the pipe A on the low pressure or suction side 1 of the diaphragm 4 and be expelled from these cylinders and valve through the pipe B on the high pressure side 2 of such valve 3. By this means a continuous flow of liquid is assured. By altering the relative positions of the axes of the valve 3 and drum 13, that is to say by altering the degree of eccentricity between the valve 3 and drum 13, the length of the stroke of the pistons 10 is altered and thus an effective variable stroke pump is provided.

If, instead of utilizing the apparatus as a pump, in the manner before described, fluid under pressure is supplied through one or the other of the passages 1 and 2 of the valve 3 the apparatus will operate as a motor, the reciprocation of the pistons 10 causing the slippers 11 to so operate, in conjunction with the inner periphery of the drum 13, as to cause the bodily rotation of the cylinder body 7 and its attached wheel or pulley 9, and it follows that the speed of rotation of the wheel will be infinitely variable at will by bearing the stroke of the pistons in the manner before described. I prefer, however, where the motor is required, to employ the particular design shown in Fig. 2, which, although operating in accordance with the same principles as the apparatus before described, differs somewhat in matters of construction. The differences in this construction are however, confined to the provision of a floating liner or inner drum 13ᵃ, capable of rotation within the non-rotatable drum 13, rollers 13ᵇ being interposed between the two drums 13 and 13ᵃ. In addition to this the slippers 11 carried by the piston heads, in the construction shown in Fig. 1, are replaced in this instance by rollers 16. The action of the apparatus is exactly similar to that of the form of my apparatus shown in Fig. 1, that is to say, fluid under pressure within one or other of the passages 1 or 2 of the stationary valve 3, will cause the reciprocation of the pistons 10 and the rollers 16 operating against the inner periphery of the floating drum or lining 13ᵃ causes the bodily rotation of the cylinder body 7 and its attached driving wheel. It should be noted in this case that the inner floating drum or liner 13ᵃ rotates bodily in company with the pistons 10 there being merely a small relative movement between the drum 13ᵃ and the roller 16, due to the fact that the distances apart of the rollers 16 measured along the circular path are continuously altering, owing to there being an eccentricity between the cylinder body 7 and the eccentric drums 13 and 13ᵃ. Here also it will be understood that although primarily designed for use as a motor this construction of my invention may be utilized as a pump, in which case the cylinder body 7 will, of course, be continuously rotated.

In order to insure the piston heads, carrying either the slippers 11 or the rollers 16, always being held up to their work, I provide a ring or rings 23 which are seated in the recessed portions 23′ of the pistons 10, and it will be noted that these rings are used, in connection with each machine with which ring 23 the heads of the pistons engage, the ring 23 always maintaining position concentric with the eccentric ring or drum 13. By this means the pistons are always maintained in proper working relation to said ring or drum 13, or, in the construction shown in Fig. 2, to the inner floating ring 13ᵃ of said ring or drum 13. In Fig. 4 I have shown two structures similar to those shown in the former figures, as applied to a single shaft to form a variable speed transmission, to be hereinafter more fully described.

Referring to Fig. 5 the numeral 3 designates a central cylindrical valve, the high pressure side 2′ of which is divided from the low pressure side 2′ by suitable form of diaphragm 4. Ports 5 and 6 are cut leading from the low and high pressure sides respectively of the valve and the liquid passes readily through these ports to and from the cylinders 7 which are mounted to rotate bodily upon the valve 3. The cylinders, of which there may be many, preferably odd number, may be arranged in more than one row if desired and those in one row may be staggered relatively to those in the next. All the cylinders are, however, rigidly connected and rotate in one mass, means such for instance as the shaft 17 being provided to enable the rotary motion to be imparted, the same shaft serving to transmit motion when the device is utilized as a motor in the manner which will be hereinafter made clear. The cylinders 7 have pistons 8 associated with them, and these pistons 8 carry rollers or other devices 16. A stroke controlling ring or drum 13ª is provided and the devices 16 coöperate with this ring and the stroke of the pistons and the velocity and direction of flow of the liquid is dependent upon the position of this ring relative to the central stationary valve 3. That is to say, the direction of the flow is dependent on which side of the valve axis the axis of the ring or drum 13ª is located, and the stroke of the pistons and velocity of the liquid is dependent on the distance separating the two axes. The ring 13ª is what may be termed a "floating" ring, and is supported by and operates on the roller bearings 11' which in turn are supported by the bracket 42, shown more clearly by Fig. 4 of the drawings. There is of course a small relative movement between the piston heads and this ring 13ª which varies with the degree of eccentricity between the ring 13ª and the valve 3. In order to maintain the rollers or other devices 16 in proper working relation with the ring or drum 13ª, I provide compensating rings 23 which engage the piston heads, such rings 23 always maintaining position concentric with the floating ring or drum 13ª.

Some means must be provided for enabling the position of the ring or drum 13ª to be arranged in various positions of eccentricity to the valve 3, and in the case of small sized apparatus a simple form of push rod can be provided and although this is all that is really necessary, I have shown by way of example one means of moving this ring. The particular mechanism shown consists of a shaft 37 carrying eccentrics 40 which engage in straps 15' in the heads of the slides 42 which carry the ring or drum 13ª. The shaft 37 has keyed upon it a worm wheel 39 and a worm 38 meshes with this worm wheel. It will readily be understood that the operation of this worm by means of a handle arranged outside of the casing 19' of the apparatus will cause the rotation of the shaft 37 and the consequent movement of the eccentric 40 will cause eccentricity to be imparted to the ring or drum 13ª. In operation of the apparatus as a pump the cylinders 8 are continuously rotated. If the ring or drum 13ª is arranged concentric with the valve 3, no flow of liquid will take place, but if some eccentricity is imparted to the ring or drum 13ª, the liquid will flow into the cylinders from what is at the moment the influx side of the valve 3 and out of the cylinders into what is at the moment the efflux side of the valve as will be readily apparent to those skilled in this class of apparatus. If however, instead of rotating the cylinders, liquid under pressure is supplied to the valve, the cylinder will be caused to bodily rotate and the speed of rotation will depend upon the degree of eccentricity of the ring or drum 13ª or in other words upon the stroke of the pistons.

In Figs. 3 and 4 I have shown one method of combining two of the devices similar to those shown in Fig. 1 to form a variable speed gear. Referring to these figures, P designates one hydraulic device acting for the moment as a pump, and M designates a second similar hydraulic device, acting for the moment as a motor. These hydraulic devices, each of which is capable of acting either as a pump or a motor, consists of rings or radiating cylinders 8 and 8', which may be arranged in one or more rows. The cylinders of both hydraulic devices P and M are mounted upon opposite ends of a common stationary valve 3 which is supported by the frame. The cylinders fit accurately so as to be capable of revolving liquid tight. Upon parts where the cylinders are mounted the valve is provided with inlet and outlet ports 5 and 6, which ports coöperate with the open ends of the cylinders 8 and 8' as such cylinders rotate bodily upon the said tube, in a manner which will hereinafter be made clear. The dividing diaphragm 4 of the valve 3 is in this example constructed in the form of a bearing as shown, and a solid transmission shaft 17 is supported in this bearing, while the ends of the shaft 17 are further supported by the ball bearings 31' and 32' carried by the casing 19' of the apparatus as a whole, while at these parts where the shaft 17 passes out of the casing on either side, stuffing boxes are provided. Upon one end of the shaft 17, that is the end nearest the source of power, which the apparatus is designed to transmit, a sleeve 35' is revolubly mounted and it is really this sleeve with the shaft within it which is supported by the ball bearings 32'.

The other end of the shaft 17 is preferably of somewhat larger diameter than the body of the shaft as a whole, but it may be exactly similar to the other end, the enlarged portion of the shaft is, however, secured to the cylinders 8, and this enlarged portion of the shaft is directly supported by the ball bearings 31'. The sleeve 35' has a flange 36' and is, by means of this flange, connected to the cylinders 8' of the hydraulic device P, which cylinders it always carries around with it when the apparatus is in operation. Similarly the enlarged end of the shaft 17 has a flange 37' by means of which such shaft is connected to and is driven by the cylinders 8 of the hydraulic device M. The cylinders 8 and 8' have pistons 10 working in them and these pistons carry rollers or equivalent devices 16 at their heads, and these rollers for instance make contact with the inner peripheries of the floating drums 13ᵃ which embraces them. In order to maintain the rollers 16 at the piston heads in proper working relation with the floating drums 13ᵃ and 14ᵃ, I provide compensating rings 23 which engage the piston heads, such rings 23 always maintaining positions concentric with the floating drums with which they are associated.

The floating drums 13ᵃ and 14ᵃ are mounted upon ball bearings 11' carried by non-rotatable rings 45ᵃ and 46ᵃ, which, as will be seen, are in general, placed eccentrically, these eccentric rings 45ᵃ and 46ᵃ are, however, so mounted in or upon supports or guides 47ᵃ rigidly secured to the casing 19' of the apparatus as to be capable of lateral sliding movement. By this means it will be readily understood that the floating drums 13ᵃ and 14ᵃ can be arranged so as to be concentric with the main axis of the apparatus, which as aforesaid, is the axis of the valve 3 or such floating drums 13ᵃ and 14ᵃ can be arranged in various positions eccentric to the main axis of the apparatus.

It will thus be seen that provision is made whereby any degree of eccentricity, in either direction can be imparted independently to each of the said floating drums, thus enabling the speed and direction of rotation of the driving mechanism to be varied and reversed, respectively. The floating drums 13ᵃ and 14ᵃ are as aforesaid, each independently adjustable, the mechanism hereinbefore described being duplicated as shown although it is not absolutely necessary that both devices should be variable. In order to provide for the central support of the shaft 37, I provide a bearing 53' in the central portion or diaphragm 54' of the casing 19' in which the inner end of one of the shafts 37 is mounted, while the inner end of the other shafts 37 is reduced and is journaled in a recess provided for the purpose in the inner end of the opposing shaft. The casing partition 54' also serves as a central support for the stationary valve 3 and may be also utilized to carry any suitable form of safety valve 55'.

The operation of this form of my apparatus is as follows:—Assuming that the sleeve 35' and the shaft 17 are unclutched from each other, the sleeve 35' will, as aforesaid, be driven and the cylinders 8' of the first hydraulic device P will be carried around. If the floating rings or drums 13ᵃ and 14ᵃ are both in their middle position, that is, the positions where their axes are coincident with the main axis of the apparatus, the oil or other liquid with which the apparatus is filled will not be circulated and the cylinders 8' will rotate idly. If, however, some eccentricity is imparted to the floating rings or drums 13ᵃ and 14ᵃ the hydraulic device P will act as a pump to an extent dependent on the degree of eccentricity of the corresponding cylindrical drum 13ᵃ and the second hydraulic device M will consequently act as the motor and the relative velocity ratios of the sleeve 35' driven from the engine, and the driven shaft 17 driven by the cylinders 8 will depend upon the relative eccentricity of the two floating drums. What really happens is that the bodily rotation of the cylinders 8' within the eccentrically situated floating drum 13ᵃ imparts reciprocating movement to the pistons or plungers 10 corresponding in amount to the degree of eccentricity of the drum 13ᵃ. By this means a pumping action is set up which causes reciprocating movement to be imparted to the pistons 10 of the cylinders 8, and, this reciprocating movement of these latter pistons 10 against the periphery of the floating drum 14ᵃ causes the bodily rotation of the cylinders 8 and the shaft 17 attached to them in company with the floating drum 14ᵃ which floats around with them.

If the eccentricities of the drums are equal and opposite, the shaft 17 will rotate at the same speed as the sleeve 35' is driven by the engine. Instead of employing rollers at the head of the pistons I may provide slippers such as 11 shown in Figs. 8, 9, 10 and 11. In this case the pistons 10 are provided with ball heads 57ᵃ upon which the slippers have angular movement. The slippers coöperate with the floating rings 13ᵃ and 14ᵃ, not shown by these figures, but clearly shown by Fig. 4 of the drawings. Fig. 8 shows a slipper provided with grooves 57ᵇ for receiving compensating rings 23 which serve to keep the slippers in correct relation with the rings or drums 13ᵃ and 14ᵃ with which the pistons coöperate. In order to provide against any tendency of the slippers to adhere to or frictionally grip the floating rings or drums when pressure is applied, I may provide the forced lubrication or pressure balancing device shown in Figs. 8 and 9. In this case the piston proper 10 has a small piston 26 within it, a spring 27 serving to keep these small pistons 26 out until the pressure rises sufficiently to overcome the pressure of said spring 27. The pistons proper 10 are bored almost directly through, the side ducts 28 shown by Fig. 9, lead from this bore into chambers 29 which in turn have passages 30 leading to the surface of the slipper. It will thus be clear that as the pressure rises oil is forced out of the passages 30 and the pressure of fluid seeks to lift the slipper from the drum and as a consequence said slipper floats off on a film of oil when oil is the fluid with which the casing is supplied. Immediately the pressure upon the small piston 26 is so much reduced that the spring 27 can operate to move the small piston 26, such movement will cause the piston 26 to be again replenished with oil or other fluid from the outside casing through the passage 35 fitted with a non-return valve 35ª. Of course I may if desirable instead of distributing the fluid through a plurality of ducts 28, bore the piston head through and continue the orifice through the slipper.

In Figs. 10 and 11 I have shown how a ball valve may be employed. The pistons 10 are in this case bored directly through the surfaces of the slipper and a valve seating 31 is provided to seat the ball 32 which is prevented from falling out by the retaining fitting 33. It will be understood that at starting, the fluid will escape through the orifice 34 and to the outside surface of the slipper, but almost immediately the ball will close down upon its seat to the pressure of fluid behind it, and thus if the fluid be oiled, effective lubrication will be provided for without any undue waste or leakage of the oil.

I claim—

1. The fluid machine comprising the combination of a cylindrical valve provided with ports, radial cylinders rotatable relative to said valve and having ports coöperating radially with the ports of said valve, pistons operating in the cylinders; a ring mounted eccentrically in relation to the primary axis of rotation with which ring the pistons coöperate without definite attachment, and a compensating ring engaging the piston heads and always maintaining position concentric with the eccentric ring.

2. The fluid machine comprising the combination with a cylindrical valve provided with ports, radial cylinders rotatable relative to said valve and having ports coöperating with the ports of said valve, and pistons operating in the cylinders; of a ring mounted eccentrically in relation to the primary axis of rotation with which ring the pistons coöperate without definite attachment, slippers capable of angular movement carried by the piston heads, and passages leading from the outside of said slippers and communicating with fluid within the pistons and means for controlling the flow of fluid through said passages.

3. The fluid machine comprising the combination of a cylindrical valve provided with ports, radial cylinders rotatable relative to said valve and having ports coöperating radially with the ports of said valve, pistons operating in the cylinders; a ring mounted eccentrically in relation to the primary axis of rotation with which ring the pistons coöperate without definite attachment, a compensating ring engaging the piston heads and always maintaining position concentric with the eccentric ring, and slippers capable of angular movement carried by the piston heads.

4. The fluid machine comprising the combination with a circular valve provided with ports, radial cylinders rotatable relative to said valve and having ports coöperating with the ports of said valve, and pistons operating in the cylinders; of a ring mounted eccentrically in relation to the primary axis of rotation, with which ring the pistons coöperate without definite attachment, a ring engaging the piston heads and always maintaining position concentric with the eccentric ring, slippers capable of angular movement carried by the piston heads, and passages leading from the outside of said slippers and communicating with fluid within the pistons and means for controlling the flow of liquid through said passages.

5. The fluid machine comprising the combination of a cylindrical valve provided with ports, radial cylinders rotatable relative to said valve and having ports coöperating radially with the ports of said valve pistons operating in the cylinders; a ring mounted eccentrically in relation to the primary axis of rotation with which ring the pistons coöperate without definite attachment, means for varying the eccentricity of the ring, and a compensating ring engaging the piston heads and always maintaining position concentric with the eccentric ring.

6. A fluid machine comprising the combination of a cylindrical valve provided with ports, radial cylinders rotatable relative to said valve, and having ports coöperating radially with the ports of said valve, pistons operating in the cylinders, a floating ring rotatable in company with the pistons and mounted eccentrically in relation of the primary axis of rotation with which ring the pistons coöperate without definite attachment, a compensating ring engaging the piston heads and always maintaining position concentric with the eccentric ring, and slippers capable of angular movement carried by the piston heads.

7. The fluid machine comprising the combination with a circular valve provided with ports, radial cylinders rotatable relative to said valve and having ports coöperating with the ports of said valve and pistons operating in the cylinders; of a ring mounted eccentrically in relation to the primary axis of rotation with which ring the pistons coöperate without definite attachment, means for varying the eccentricity of the ring, slippers capable of angular movement carried by the piston heads, and passages leading from the outside of said slippers and communicating with fluid within the pistons and means for controlling the flow of fluid through said passages.

8. The fluid machine comprising the combination with a circular valve provided with ports, radial cylinders rotatable relative to said valve and having ports coöperating with the ports of said valve and pistons operating in the cylinders; of a ring rotatable in company with the pistons and mounted eccentrically in relation to the primary axis of rotation, with which ring the pistons coöperate without definite attachment, slippers capable of angular movement carried by the piston heads, and passages leading from the outside of said slippers and communicating with fluid within the pistons and means for controlling the flow of liquid through said passages.

9. The fluid machine comprising the combination of a cylindrical valve provided with ports, radial cylinders rotatable relative to said valve and having ports coöperating radially with the ports of said valve pistons operating in the cylinders; a ring rotatable in company with the pistons and mounted eccentrically in relation to the primary axis of rotation with which ring the pistons coöperate without definite attachment, a compensating ring engaging the piston heads and always maintaining position concentric with the eccentric ring, and slippers capable of angular movement carried by the piston heads.

10. The fluid machine comprising the combination with a circular valve provided with ports, radial cylinders rotatable relative to said valve and having ports coöperating with the ports of said valve and pistons operating in the cylinders; of a ring rotatable in company with the pistons and mounted eccentrically in relation to the primary axis of rotation, with which ring the pistons coöperate without definite attachment, a ring engaging the piston heads and always maintaining position concentric with the eccentric ring, slippers capable of angular movement carried by the piston heads, and passages leading from the outside of said slippers and communicating with fluid within the pistons and means for controlling the flow of fluid through said passages.

11. The fluid machine comprising the combination of a cylindrical valve provided with ports, radial cylinders rotatable relative to said valve and having ports coöperating radially with the ports of said valve, pistons operating in the cylinders of a floating ring rotatable in company with the pistons and mounted eccentrically in relation to the primary axis of rotation, with which ring the pistons coöperate without definite attachment, means for varying the eccentricity of the ring, and a compensating ring engaging the piston heads and always maintaining position concentric with the eccentric ring.

12. The fluid machine comprising the combination of a cylindrical valve provided with ports, radial cylinders rotatable relative to said valve and having ports coöperating radially with the ports of said valve, pistons operating in the cylinders, of a floating ring rotatable in company with the pistons and mounted eccentrically in relation to the primary axis of rotation, with which ring the pistons coöperate without definite attachment, means for varying the eccentricity of the ring, a compensating ring engaging the piston heads and always maintaining position concentric with the eccentric ring, and means carried by the piston heads for acting as wear plates for the pistons.

13. The fluid machine comprising the combination of a circular valve provided with ports, radial cylinders rotatable relative to said valve and having ports coöperating radially with the ports of said valve, pistons operating in the cylinders; a ring rotatable in company with the pistons and mounted eccentrically in relation to the primary axis of rotation, with which ring the pistons coöperate without definite attachment, means for varying the eccentricity of the ring, a compensating ring engaging the piston heads and rotating with them and always maintaining position concentric with the eccentric ring, and slippers capable of angular movement carried by the piston heads.

14. The fluid machine comprising the combination with a circular valve provided with ports, radial cylinders rotatable relative to said valve and having ports coöperating with the ports of said valve and pistons operating in the cylinders; of a ring rotatable in company with the piston and mounted eccentrically in relation to the primary axis of rotation, with which ring the pistons coöperate without definite attachment, means for varying the eccentricity of the ring, a ring engaging the piston heads and always maintaining position concentric with the eccentric ring, slippers capable of angular movement carried by the piston heads, and passages leading from the outside of said slippers and communicating with fluid within the pistons and means for controlling the flow of fluid through said passages.

15. The fluid machine comprising the combination with a circular valve provided with ports, radial cylinders rotatable relative to said valve and having ports coöperating with the ports of said valve and pistons operating in the cylinders; of a ring rotatable in company with the pistons and mounted eccentrically in relation to the primary axis of rotation, with which ring the pistons coöperate without definite attachment, means for varying the eccentricity of the ring, slippers capable of angular movement carried by the piston heads, and passages leading from the outside of said slippers and communicating with fluid within the pistons and means for controlling the flow of fluid through said passages.

16. In variable hydraulic transmission devices, the combination of a pump structure comprising the combination of a cylindrical valve provided with ports, radial cylinders rotatable relative to said valve and having ports coöperating radially with the ports of said valve, pistons operating in the cylinders, a ring mounted eccentrically in relation to the primary axis of rotation with which ring the pistons coöperate without definite attachment, and a compensating ring engaging the piston heads and rotatable in company with them and always maintaining position concentric with the eccentric ring and means for carying the eccentricity of said ring; of a motor structure comprising the combination of a cylindrical valve provided with ports, radial cylinders rotatable relative to said valve and having ports coöperating radially with the ports of said valve and pistons operating in the cylinders; a ring mounted eccentrically in relation to the primary axis of rotation with which ring the pistons coöperate without definite attachment, substantially as described.

17. In variable hydraulic transmission devices, the combination of a pump structure comprising the combination with a circular valve provided with ports, radial cylinders rotatable relative to said valve and having ports coöperating with the ports of said valve, and pistons operating in the cylinders; of a ring mounted eccentrically in relation to the primary axis of rotation with which ring the pistons coöperate without definite attachment, slippers capable of angular movement carried by the piston heads, and passages leading from the outside of said slippers and communicating with fluid within the pistons and means for controlling the flow of fluid through said passages; of a motor structure comprising the combination with a circular valve provided with ports, radial cylinders rotatable relative to said valve and having ports coöperating with the ports of said valve and pistons operating in the cylinders; of a ring mounted eccentrically in relation to the primary axis of rotation with which ring the pistons coöperate without definite attachment, and means for varying the eccentricity of the ring, substantially as described.

18. In variable hydraulic transmission devices, the combination of a pump structure comprising the combination of a cylindrical valve provided with ports, radial cylinders rotatable relative to said valve and having ports coöperating radially with the ports of said valve, pistons operating in the cylinders; a ring mounted eccentrically in relation to the primary axis of rotation with which ring the pistons coöperate without definite attachment, a ring engaging the piston heads and always maintaining position concentric with the eccentric ring, and slippers capable of angular movement carried by the piston heads and means for varying the eccentricity of said ring; of a motor structure comprising the combination of a cylindrical valve provided with ports, radial cylinders rotatable relative to said valve and having ports coöperating radially with the ports of said valve, pistons operating in the cylinders; and a ring mounted eccentrically in relation to the primary axis of rotation with which ring the pistons coöperate without definite attachment, substantially as described.

19. In variable hydraulic transmission devices, the combination of a pump structure comprising the combination with a circular valve provided with ports, radial cylinders rotatable relative to said valve and having ports coöperating with the ports of said valve, and pistons operating in the cylinders; of a ring mounted eccentrically in relation to the primary axis of rotation, with which ring the pistons coöperate without definite attachment, a ring engaging the piston heads and always maintaining position concentric with the eccentric ring, slippers capable of angular movement carried by the piston heads, and passages leading from the outside of said slippers and communicating with fluid within the pistons and means for controlling the flow of liquid through said passages; of a motor structure comprising the combination with a circular valve provided with ports, radial cylinders rotatable relative to said valve and having ports coöperating with the ports of said valve and pistons operating in the cylinders; of a ring mounted eccentrically in relation to the primary axis of rotation with which ring the pistons coöperate without definite attachment, and means for varying the eccentricity of the ring, substantially as described.

20. In variable hydraulic transmission devices, the combination of a pump structure comprising the combination of a cylindrical valve provided with ports, radial cylinders rotatable relative to said valve and having ports coöperating radially with the ports of said valve, pistons operating in the cylinders; a ring mounted eccentrically in relation to the primary axis of rotation with which ring the pistons coöperate without definite attachment, a compensating ring engaging the piston heads and rotating in company with them and always maintaining position concentric with the eccentric ring, and rollers carried by the piston heads; of a motor structure comprising the combination of a cylindrical valve provided with ports, radial cylinders rotatable relative to said valve and having ports coöperating radially with the ports of said valve, pistons operating in the cylinders; a ring mounted eccentrically in relation to the primary axis of rotation with which ring the pistons coöperate without definite attachment, and
5 means for varying the eccentricity of the ring, substantially as described.

In testimony whereof I have affixed my signature in presence of two witnesses.

HENRY SELBY HELE-SHAW.

Witnesses:
 Aug. A. Thornton,
 H. D. Jameson.